United States Patent
Yoshida et al.

(10) Patent No.: US 6,384,558 B2
(45) Date of Patent: May 7, 2002

(54) DRIVING DEVICE FOR MOTOR-DRIVEN COMPRESSOR

(75) Inventors: Makoto Yoshida; Nobuyuki Nishii, both of Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/734,937

(22) Filed: Dec. 12, 2000

(30) Foreign Application Priority Data

Dec. 13, 1999 (JP) .......................................... 11-352944

(51) Int. Cl.$^7$ ................................................. H02P 3/00
(52) U.S. Cl. ........................ 318/445; 318/800; 318/441
(58) Field of Search ................................. 318/445, 441, 318/800, 801, 139, 452, 254

(56) References Cited

U.S. PATENT DOCUMENTS

| | | | |
|---|---|---|---|
| 4,463,296 A | * 7/1984 | Tada et al. | 318/452 |
| 4,518,316 A | * 5/1985 | Yokota | 417/12 |
| 5,200,644 A | * 4/1993 | Kobayashi et al. | 307/66 |
| 5,369,540 A | * 11/1994 | Konrad et al. | 361/6 |
| 6,002,220 A | * 12/1999 | Takahashi et al. | 318/139 |
| 6,049,185 A | * 4/2000 | Ikeda | 318/442 |

* cited by examiner

*Primary Examiner*—Robert E. Nappi
*Assistant Examiner*—Rita Leykin
(74) *Attorney, Agent, or Firm*—Ratner & Prestia

(57) ABSTRACT

A driving device for a motor-driven compressor including: (a) a motor-driven compressor for compressing a refrigerant; (b) a DC power supply serving as a power source of the compressor; (c) a capacitor connected in parallel with the DC power supply; (d) a switch provided between the DC power supply and the capacitor, and closed when the compressor is operated and opened when the compressor is stopped; (e) a driver for converting electric power supplied from the DC power supply via the switch and capacitor into driving power for the compressor, and for outputting the driving power thereto; (f) a controller for instructing the driver to operate or stop the compressor; and (g) a discharge control unit provided in the driver and controlling the driver so that the capacitor is discharged using the compressor as a medium, after the instruction to stop the compressor has been given.

6 Claims, 8 Drawing Sheets

DRIVING DEVICE FOR MOTOR-DRIVEN COMPRESSOR

FIELD OF THE INVENTION

The present invention relates to a driving device for a motor-driven compressor having an electrolytic capacitor in its power unit, and particularly to the discharge of an electrolytic capacitor in an air-conditioning system in household and automobile applications where safety must be assured to protect human bodies from electric shocks, firing, burns, and other hazards.

BACKGROUND OF THE INVENTION

Conventionally, motor-driven compressors (herein after simply referred to as "compressors") have been used mainly for household air-conditioning systems. However, with the recent penetration of electric vehicles, hybrid cars, fuel cell powered vehicles, or the like, an increasing number of compressors are also used for automobile air-conditioning systems. FIG. 7 shows a circuit diagram of a driving device used for a compressor in a conventional air-conditioning system incorporated in an automobile.

In FIG. 7, compressor 501 of the air-conditioning system has a three-phase motor unit and a compressing unit therein. Battery 502 serves as a power source of both compressor 501 and a drive motor, and normally supplies voltages ranging from 100 V to 300 V.

Switch 504 turns on/off the power supplied from battery 502 as required, and is always closed when compressor 501 is operated. The power from battery 502 is supplied to driver 505 via switch 504 and electrolytic capacitor for smoothing current 503. Driver 505 includes a plurality of switching elements for supplying power to compressor 501 and base (gate) drive circuit 511 for driving the elements.

Driver 505 performs inverter control and pulse width modulation (PWM) on DC voltages supplied from battery 502 thereby to convert them into pseudo AC voltages (sine wave) formed by positive and negative rectangular pulses. Then, the driver changes the voltages or frequencies to control the number of revolutions of compressor 501. The values specifying the numbers of revolutions are given from air-conditioning controller 506 that controls the entire air-conditioning system. Controller 506 determines the numbers of revolutions of compressor 501 so that the inside of the automobile is always kept comfortable in accordance with its environmental conditions, and sends the specified values to driver 505.

Hereinafter described is how capacitor 503 discharges for a conventional driving device after the operation of compressor 501 is stopped and switch 504 is opened.

During the operation of compressor 501, driving current flows through driver 505. On the other hand, even when compressor 501 is at rest, some amounts of current flows. That is, driver 505 includes a microcomputer for control and various protection networks therein and such circuits carry a small amount of current (hereinafter referred to as "dark current"), though it is weaker than the driving current for the compressor.

Capacitor 503 is discharged by this dark current after compressor 501 has stopped, and it takes a considerable period of time to discharge the capacitor completely. For example, when the supply voltage is 300 V, the capacitance of the capacitor is 1000 $\mu$F, and the dark current is 20 mA and constant, it takes 15 seconds to discharge the capacitor completely. It takes 13.5 seconds to discharge the capacitor to 30 V, which is said to a safety voltage at which human bodies do not get electric shocks in an automobile.

FIG. 8A is a timing chart showing the operations of each component after compressor 501 starts its operation and then stops, and before capacitor 503 completes discharge. Now this timing chart is explained.

At timing A, the instruction from controller 506 is changed from "Stop" to "Operate". Then, the signal is sent to switch 504 and the switch 504 is closed after time T1 delay. This time T1 delay is an operational delay of switch 504. Upon closure of switch 504, capacitor 503 is charged, output of driver 505 is switched on, and energization to compressor 501 is started.

Next, when the instruction from controller 506 is changed from "Operate" to "Stop" at timing B, switch 504 is opened after time T1 delay, and at the same time, output from driver 505 is switched off and compressor 501 is de-energized. Since the voltage of capacitor 503 after that time depends on the natural discharge caused by the dark current as mentioned above, it slowly decreases over time T4. Thus, capacitor 503 is discharged completely. The time T4 is 15 seconds under the above conditions.

FIG. 8B is a control flow chart of driver 505. Capacitor 503 is naturally discharged by the dark current and no special discharge control is performed on it.

With the recent penetration of electric vehicles, hybrid cars, and fuel cell powered vehicles, or the like, safety measures to protect not only crew but also mechanics engaged in maintenance of such vehicles from high voltages is becoming necessary.

However, with the above-mentioned conventional driving device for a motor-driven compressor, it takes about a dozen seconds to discharge the electrolytic capacitor. During maintenance work of an air-conditioning system, mechanics may misunderstand the system has been stopped and touch the circuits, even though the discharge of the capacitor has not been completed yet. Therefore, the conventional driver for a compressor has a problem that some safety measures must be taken for such a case.

When a capacitor that has not completely discharged yet is short-circuited with tools or the like, sparking occurs. Safety from such a case must be assured. Particularly, since hybrid cars carry gasoline, they require additional assurances of safety. Similarly, since fuel cell powered vehicles, or the like, use hydrogen as a fuel, they also require additional assurances of safety. Moreover, for hydrocarbons (e.g. propane) recently used as a new refrigerant for air-conditioning systems, maximum safety must be assured in the replacement of gas.

In addition, the conventional driver for a compressor has another problem that when an external resistor is installed to discharge the capacitor for a shorter period of time, the resistor carries current and thus increases the loss of the circuit and the size of the system.

SUMMARY OF THE INVENTION

The present invention addresses the problems discussed above. It is, therefore, an object of the present invention to provide a small and high-efficient driving device for a motor-driven compressor assuring safety of the crew and mechanics, in an air-conditioning system to be incorporated in an electric vehicle, hybrid car, or fuel cell powered vehicle, or the like, operating from a high-voltage source, and also in an air-conditioning system using flammable refrigerants.

A driving device for a motor-driven compressor of the present invention is comprised of:

(a) a motor-driven compressor for compressing a refrigerant;
(b) a DC power supply serving as a power source of the motor-driven compressor;
(c) a capacitor connected in parallel with the DC power supply;
(d) a switch provided between the DC power supply and the capacitor, and closed when the motor-driven compressor is operated and opened when the compressor is stopped;
(e) a driver for converting electric power supplied from the DC power supply via the switch and the capacitor into driving power for the motor-driven compressor, and for outputting the driving power thereto;
(f) a controller for instructing the driver to operate or stop the motor-driven compressor; and
(g) a discharge control unit provided in the driver and controlling the driver so that the capacitor is discharged using the motor-driven compressor as a medium, after the instruction to stop the motor-driven compressor is given.

The above structure allows the control of the driver so that the capacitor is discharged using the motor-driven compressor as a medium for discharge; thereby realizes a small and high-efficient driving device for a motor-driven compressor with maximum safety.

DETAILED DESCRIPTION OF THE INVENTION

Exemplary embodiments of the present invention are hereinafter demonstrated with reference to the accompanying drawings.

Exemplary Embodiment 1

Figure 1:
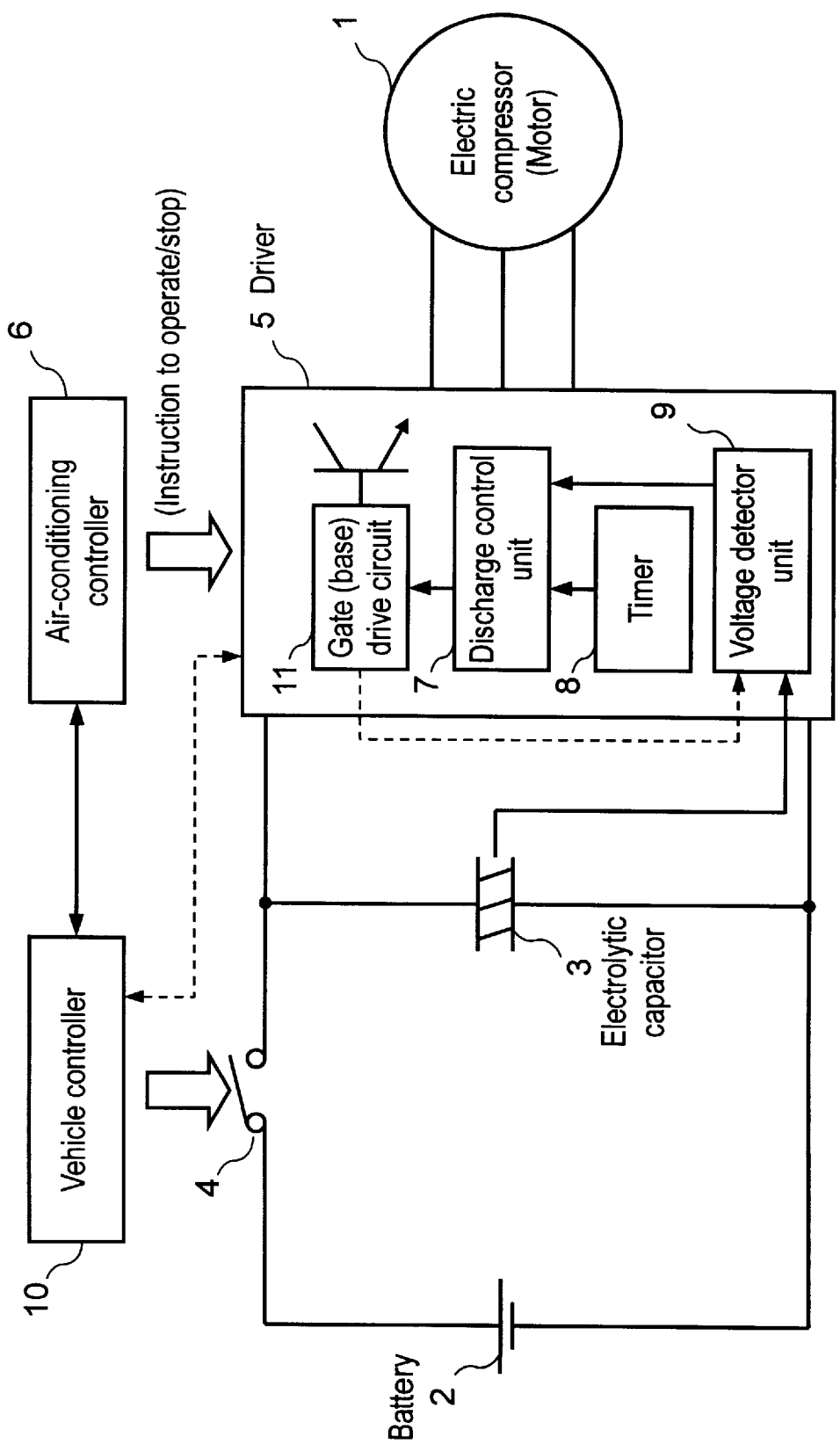
FIG. 1 is a circuit diagram showing a driving device for a motor-driven compressor in accordance with a first exemplary embodiment of the present invention.

FIG. 1 is a circuit diagram of a driving device for a motor-driven compressor in accordance with the first exemplary embodiment of the present invention.

In FIG. 1, compressor 1 in the air-conditioning system has a three-phase motor unit and compressing unit therein. A DC power supply, battery 2, serves as a power source of both compressor 1 and a drive motor, and normally supplies voltages ranging from 100 V to 300 V.

Switch 4 turns on/off the power supplied from battery 2 as required, and is always closed when compressor 1 is operated. The power from battery 2 is supplied to driver 5 via switch 4 and electrolytic capacitor 3 for smoothing current. Capacitor 3 is connected in parallel with battery 2. Switch 4 is provided between battery 2 and capacitor 3.

Driver 5 performs inverter control and pulse width modulation (PWM) on DC voltages supplied from battery 2 thereby to convert them into pseudo AC voltages (sine wave) formed by positive and negative rectangular pulses. Then, the driver changes the voltages and/or frequencies to control the number of revolutions of compressor 1. The values specifying the numbers of revolutions are given from air-conditioning controller 6 that controls the entire air-conditioning system. Controller 6 determines the numbers of revolutions of compressor 1 so that the inside of the automobile is always kept comfortable in accordance with its environmental conditions, and sends the specified values to driver 5.

Driver 5 includes a plurality of switching elements for supplying power to compressor 1, such as insulated gate bipolar transistors (IGBT) and ordinary bipolar transistors. It also includes gate (base) drive circuit 11 for driving the gates or bases, i.e. control input terminals of such switching elements. In addition, driver 5 also includes therein voltage detector unit 9 for detecting the voltage of capacitor 3, timer 8 for measuring time using various signals as triggers, and discharge control unit 7 for outputting control signals to the gate (or base) drive circuit of the semiconductor switching elements receiving the signals from voltage detector unit 9 and timer 8.

At this moment, voltage detector unit 9 can detect the voltage of capacitor 3 directly or the voltage of any other component that has a certain relation with the voltage of capacitor 3, such as gate drive circuit 11 as shown by the broken line. More preferable is using the voltage of gate drive circuit 11. The reasons are as follows. If the gate voltage of the above switching elements drop for some reasons, the switching elements emit more heat and thus their reliability may be affected. Therefore, in many cases, a protection network against the gate voltage drop is originally incorporated in the gate drive circuit as a countermeasure, and using this protection network can simplify the circuits. In such a case, the protection function against the gate voltage drop must be set so as to operate only when the voltage of capacitor 3 is lower than a voltage at which an electric shock may be caused.

Vehicle controller 10 controls the entire vehicle. When a crew turns on a key switch and selects the operation of the air-conditioning system, the signal is fed back to vehicle controller 10 and a signal for closing the switch 4 is outputted. When the crew selects the stop of the air-conditioning system, a signal for opening the switch 4 is outputted. The feedback of the operation/stop state of the air-conditioning system to vehicle controller 10 can also be made from driver 5.

Next, the operation of the driver structured above in accordance with exemplary embodiment 1 is described.

When the air-conditioning system is instructed to stop the operation, an instruction to stop motor-driven compressor 1 is given from air-conditioning controller 6 to driver 5. Then, discharge control unit 7 discharges the electric charge of electrolytic capacitor 3 using compressor 1 as a load for the discharge. Generally, since the internal resistance of the motor constituting compressor 1 is very low, discharge current sufficiently larger than the dark current can be obtained, thus allowing the discharge for a short period of time. For example, when capacitor 3 having a terminal voltage of 300 V and a capacitance of 1000 μF is discharged at a discharge current of 1 A, the discharge is completed in 300 milliseconds and the discharge time can considerably be reduced compared with the conventional driver.

Therefore, the driving device for a motor-driven compressor in accordance with exemplary embodiment 1 can assure safety of the crew and mechanics in an air-conditioning system incorporated in an electric vehicle, hybrid car, and fuel cell powered vehicle, or the like, or in another air-conditioning system using a flammable refrigerant. In addition, without requiring such additional circuits as a discharging resistor, the driving device for a motor-driven compressor is small and high efficient, and moreover, improvement in reliability can be expected.

Exemplary Embodiment 2

The driving device for a motor-driven compressor in accordance with exemplary embodiment 2 is structured in the same manner as the above exemplary embodiment 1 shown in FIG. 1. Exemplary embodiment 2 differs from exemplary embodiment 1 in that discharge control unit 7 controls the driver so that capacitor 3 is discharged while driver 5 continues energization to compressor 1 for a predetermined period of time after the instruction to stop compressor 1 is given. Since the capacitor discharges while compressor 1 is operating and the load current is still flowing during the above-mentioned predetermined period of time, a discharge current much larger than that of exemplary embodiment 1 can be obtained, thus allowing the discharge for a shorter period of time. For example, when capacitor having a terminal voltage of 300 V and a capacitance of 1000 μF is discharged at a discharge current of 10 A, the discharge can be completed in 30 milliseconds.

Next, the operation of the driver in accordance with exemplary embodiment 2 is detailed.

Figure 2B:
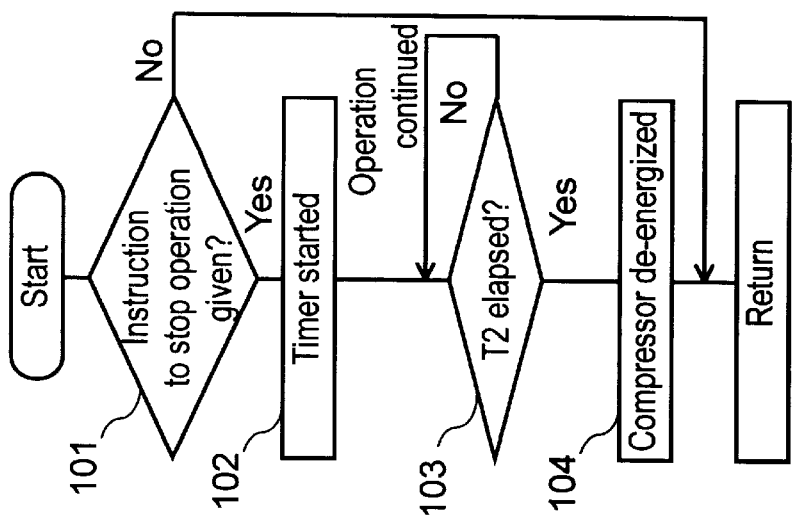
FIG. 2B is a control flow chart of the driving device in accordance with the second embodiment.
Figure 2A:
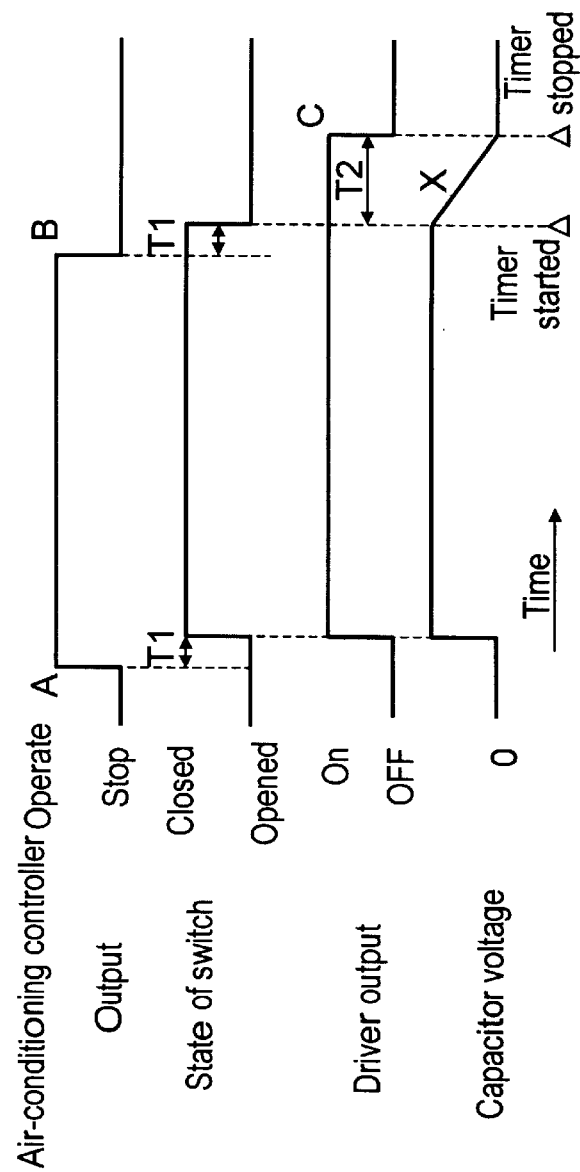
FIG. 2A is a timing chart showing the operation of a driving device for a motor-driven compressor in accordance with a second exemplary embodiment of the present invention.

FIG. 2A is a timing chart showing the operations in accordance with exemplary embodiment 2 of the present invention.

First, at timing A, air-conditioning controller 6 outputs an instruction to operate the compressor to vehicle controller 10 and driver 5. Responsive to the signal from vehicle controller 10, switch 4 is closed after time T1 delay from timing A. At the same time, output from driver 5 is switched on and energization to motor-driven compressor 1 is started. At this moment, upon closure of switch 4, capacitor 3 is charged to the voltage of battery 2, i.e. supply voltage.

Next, during operation, when an instruction to stop the compressor is outputted from controller 6 at timing B, switch 4 is opened after time T1 delay from timing B, and at the same time, timer 8 in the driver starts measuring time. During this period of time, output of driver 5 is kept ON and thus compressor 1 is kept energized. As a result, capacitor 3 discharges at an ordinary load current, e.g. 10 A, so it discharges quickly as shown by section X in FIG. 2A.

Subsequently, at timing C, i.e. when timer 8 has measured a predetermined period of time T2 and the electric charge of capacitor 3 has sufficiently been discharged, the measuring operation of timer 8 is stopped and output of driver 5 is switched off. This predetermined period of time T2 is such that, for example, capacitor 3 having a terminal voltage of 300 V and a capacitance of 1000 μF can be discharged completely at a discharge current 10 A only in 30 milliseconds. Therefore, crew or mechanics hardly receive electric shocks or make the air-conditioning system short-circuited after they stop the system.

In this exemplary embodiment 2, discharge will be completed when timer 8 is set to a value around 30 milliseconds or larger. Even with a value smaller than 30 milliseconds, electric hazards to human bodies or large sparking will not occur when the value is selected so that the capacitor is discharged to a voltage lower than 30 V. However, in case of discharging the capacitor completely, driver 5 must operate normally after the capacitor has been discharged and thus the controller in driver 5 must be provided with an additional power supply other than battery 2 shown in FIG. 1. Such type of vehicles are generally equipped with a 12-V battery as a control power for the entire vehicle, it can be used for this purpose.

FIG. 2B is a control flow chart of driver 5 in accordance with exemplary embodiment 2.

First, whether an instruction to stop the operation has been given to driver 5 is checked (Step 101). When the instruction has been given, timer 8 is made to start measuring time (Step102). Next, whether predetermined period of time T2 has been elapsed is checked (Step103). When time T2 has been elapsed, compressor 1 is de-energized and the operation is completed (Step104). When time T2 has not been elapsed, energization to compressor 1 is continued (Step 103 again). When an instruction to stop the operation has not been given, the operation of compressor 1 is continued. By controlling in this manner, the electric charge of capacitor 3 can be discharged for a very short period of time without the need of any additional circuit.

Exemplary Embodiment 3

The driving device for a motor-driven compressor in accordance with exemplary embodiment 3 is structured in the same manner as exemplary embodiment 1 shown FIG. 1. In exemplary embodiment 3, discharge control unit 7 controls the driver so that capacitor 3 is discharged while the driver continues to energize compressor 1 until the voltage detected by voltage detector unit 9 decreases to a predetermined value or lower, after the instruction to stop compressor 1 is given.

As mentioned above, setting a certain voltage to which the capacitor is discharged eliminates the need of complete discharge, thus allowing the discharge for a time period much shorter than that of exemplary embodiment 2. For example, when capacitor 3 having a terminal voltage of 300 V and a capacitance of 1000 μF is discharged to 30 V at a discharge current of 10 A, the discharge can be made in 27 milliseconds. Generally, a driver itself has a lower limit of its operating voltage and the discharge can be performed within this operating voltage range; thus no additional external power source is required. The voltage to which the capacitor is discharged may be set to a range causing no electric hazards to human bodies and within the operating voltage range of the driver.

The operation of the driving device in accordance with exemplary embodiment 3 is described with reference to a timing chart shown in FIG. 3A. The operations performed between timing A and timing B are the same as those of exemplary embodiment 2 shown in FIG. 2A, so the description is omitted.

When an instruction to stop the operation is given from air-conditioning controller 6 at timing B during operation, switch 4 is opened after time T1 delay; however, output of driver 5 is kept ON in spite of the instruction to stop the operation. At this moment, the electric charge of capacitor 3 is discharged at a current around which the compressor has been operated, e.g. 10 A, and thus the discharge is made quickly as shown by section Y in FIG. 3A. When the voltage of capacitor 3 decreases to predetermined value VL, i.e. at timing D, output of driver 5 is switched off to de-energize compressor 1. After timing D, capacitor slowly discharges at the dark current.

When voltage VL is set to around 30 V, human bodies hardly receive electric shocks. For example, when capacitor 3 having a terminal voltage of 300 V and a capacitance of 1000 $\mu$F is discharged at a discharge current of 10 A, the time taken to discharge the capacitor to 30 V is only 27 milliseconds. Therefore, mechanics or crew hardly receive electric shocks or make the air-conditioning system short-circuited after they stop the system.

Moreover, when driver 5 is designed to operate normally as far as the voltage of capacitor 3 is at least VL (30 V), an additional external power supply, which is required for exemplary embodiment 2, is not required.

Figure 3B:
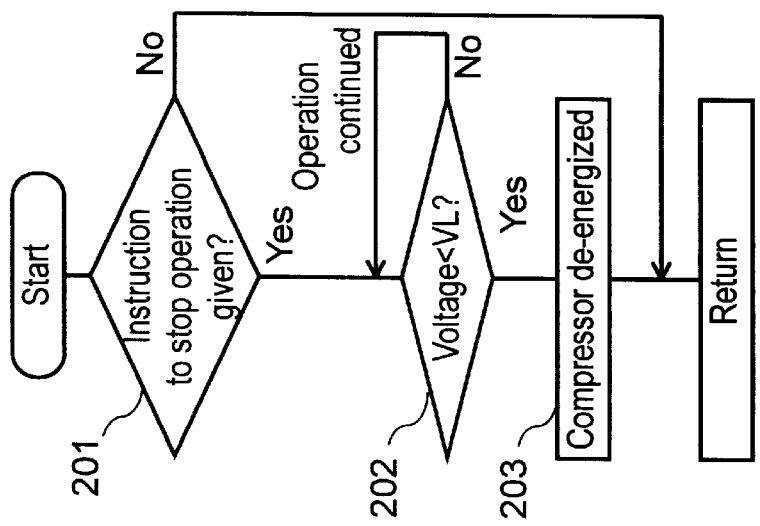
FIG. 3B is a control flow chart of the driving device in accordance with the third embodiment.
Figure 3A:
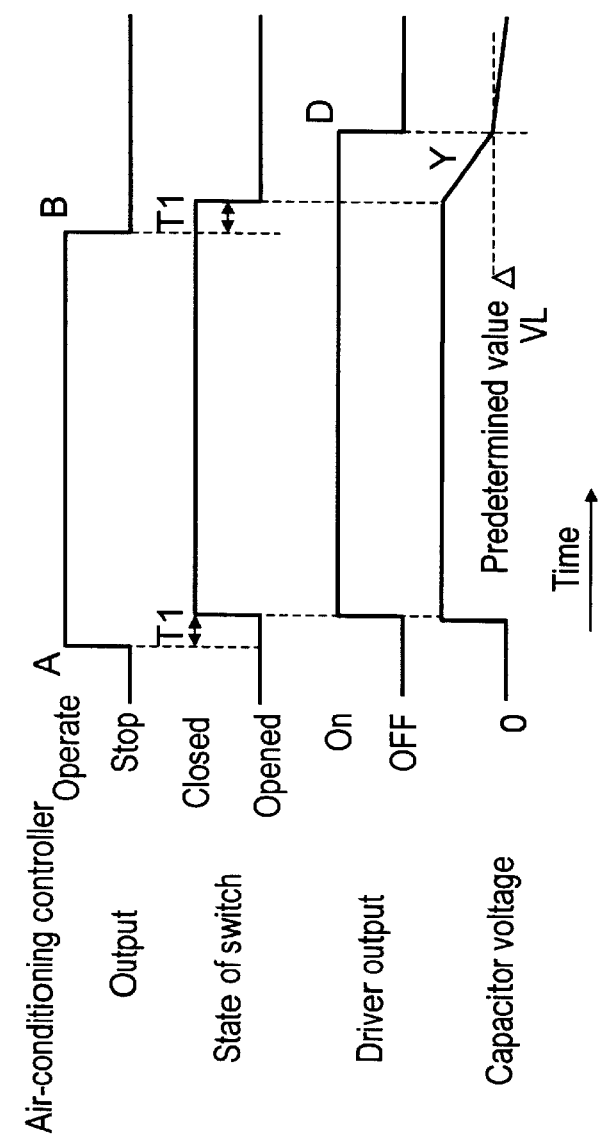
FIG. 3A is a timing chart showing the operation of a driving device for a motor-driven compressor in accordance with a third exemplary embodiment of the present invention.

FIG. 3B is a control flow chart of driver 5 in accordance with exemplary embodiment 3. First, whether an instruction to stop the operation has been given to driver 5 is checked (Step 201). When the instruction has been given, whether the voltage of capacitor 3 is smaller than VL is checked with output of driver 5 kept ON (Step 202). When the voltage of the capacitor is below VL, output of driver 5 is switched off to de-energize compressor 1 (Step 203). When the voltage of capacitor is not yet smaller than VL, energization to compressor 1 is continued (Step 202 again). When the instruction to stop the operation has not been given to driver 5, energization to compressor 1 is continued. By controlling in this manner, the driver in accordance with exemplary embodiment 3 need not include any additional power supply in the control unit of driver 5, which is required for exemplary embodiment 2, thus realizing a smaller and simplified system as a whole.

Exemplary Embodiment 4

For the above exemplary embodiments 2 and 3, switch 4 is operated from a closed state to an opened state with compressor 1 carrying load current.

On the other hand, for exemplary embodiment 4, discharge control unit 7 controls the driver in the following manner. After an instruction to stop compressor 1 is given, compressor 1 is de-energized once and switch 4 is operated from a closed state to an opened state. Then, after a predetermined period of time has elapsed, compressor 1 is re-energized to discharge the electric charge of capacitor 3. Therefore, switch 4 can be operated from the closed state to the opened state with compressor 1 carrying no load current, and thus stress on the contact of switch 4 can be reduced. During a waiting time provided from the de-energization to the re-energization, compressor 1 is rotated by its inertia. Since the compressor is re-energized during the rotation by inertia, stress on the compressing unit of compressor 1 and circuits caused by braking and a regenerative status can be prevented and this stress-reduced design results in the improvement in compressor reliability.

The above waiting time may be set longer than the time taken from the de-energization of compressor 1 to the halt of its rotation.

Exemplary Embodiment 5

For exemplary embodiment 5, discharge control unit 9 controls the driver in the following manner.

After an instruction to stop compressor 1 is given, compressor 1 is de-energized once and switch 4 is operated from a closed state to an opened state. Then, after a predetermined period of time has elapsed, energization to compressor 1 is started again and continued until the voltage of capacitor 3 detected by voltage detector unit 9 decreases to a predetermined value or lower, in order to discharge capacitor 3. The voltage detected by detector unit 9 can be any voltage that varies with the voltage of capacitor 3.

Since switch 4 can be operated from the closed state to the opened state with compressor 1 carrying no load current, stress on the contact of switch 4 can be reduced. Like exemplary embodiment 4, since a waiting time is provided between the de-energization and the re-energization, compressor 1 is re-energized while being rotated by its inertia. Thus, stress on the compressing unit of compressor 1 and circuits caused by braking and a regenerative status can be prevented, and this stress-reduced design results in the improvement in compressor reliability. The above waiting time may be set longer than the time taken from the de-energization of compressor 1 to the halt of its rotation.

Moreover, for exemplary embodiment 5, setting a voltage to which the capacitor is discharged eliminates the need of complete discharge, thus making the discharge time period much shorter than that of exemplary embodiment 4.

Figure 4B:
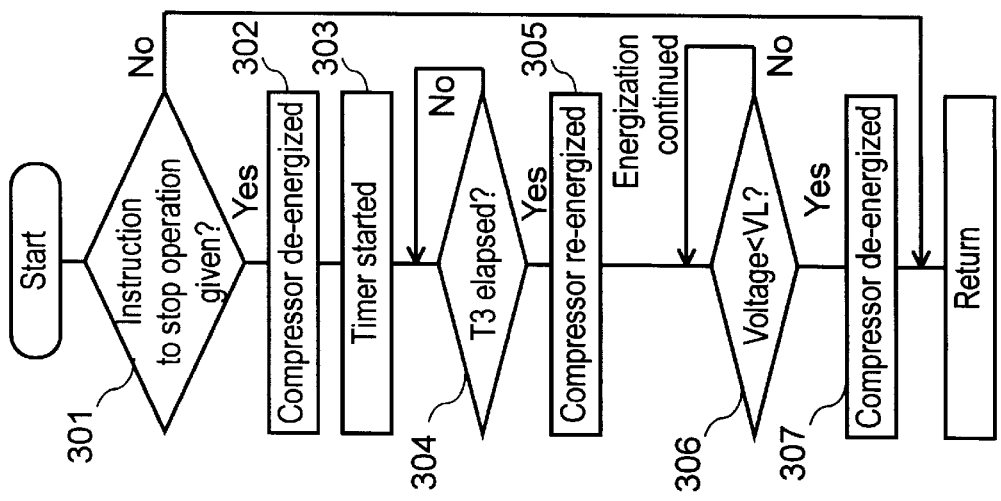
FIG. 4B is a control flow chart of the driving device in accordance with the fourth and fifth embodiments.
Figure 4A:
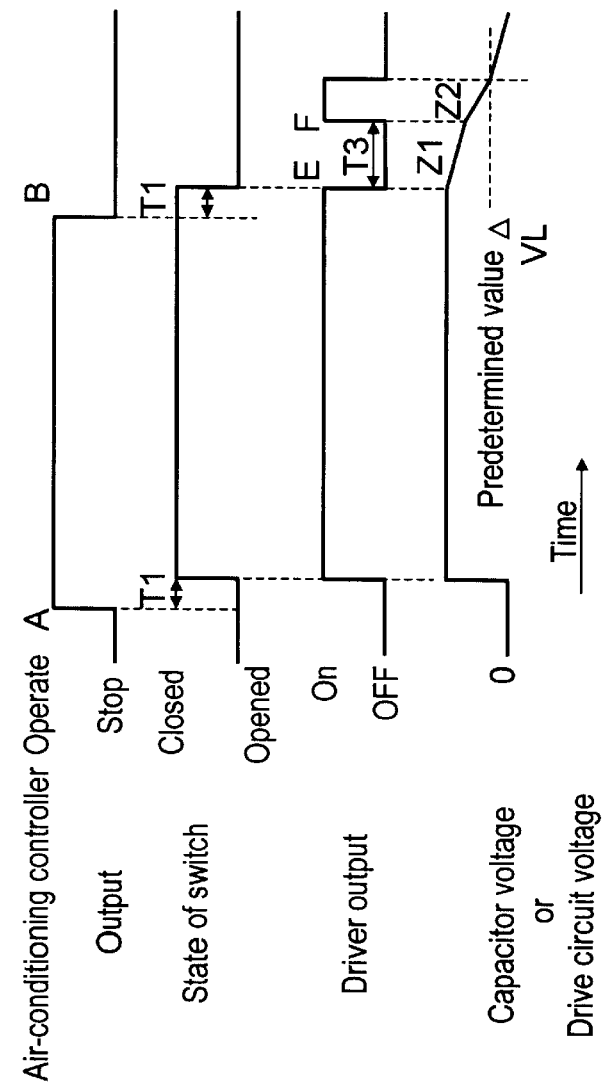
FIG. 4A is a timing chart showing the operation of a driving device for a motor-driven compressor in accordance with fourth and fifth exemplary embodiments of the present invention.

Next, with reference to a timing chart shown in FIG. 4A, the operations in accordance with exemplary embodiments 4 and 5 are described. The operations performed from timing A to timing B are the same as those of exemplary embodiment 2 shown in FIG. 2A, so the description is omitted.

At timing B, an instruction to stop the operation is given from air-conditioning controller 6. Then, after time T1 delay, i.e. at timing E, upon opening of switch 4, output of driver 5 is switched off once. Since switch 4 requires the operation time of its mechanical contact, output of driver 5 is always switched off earlier, even if the switch and driver start their turning off operations at the same time. Therefore, unlike the cases of exemplary embodiments 2 and 3 where switch 4 interrupts the operating current in advance, compressor 1 is de-energized by switching off output of driver in advance. Thus stress on the contact of switch 4 is smaller and this stress-reduced design results in the improvement in compressor reliability.

Since compressor 1 is still kept rotated after de-energization by its inertia for several hundred milliseconds according to experiments, a period of time to wait for re-energization is set as time T3. If required, it is preferable to wait for re-energization until the rotation of compressor 1 halts.

For example, when a compressor is re-energized during the rotation by its inertia, its compressing unit may be damaged by abnormal braking or, in some cases, by the application of accelerated torque to the motor. In addition, if it is a permanent magnet motor, a regenerative status is caused and the motor may be damaged by a large current flowing though the motor or driver. In such cases, it is preferable to wait until the rotation of compressor 1 is stopped.

During this waiting time T3, as shown by section Z1 in FIG. 4A, the capacitor is naturally discharged by the dark current.

Hereinabove described are the operations in accordance with exemplary embodiment 4.

The operations in accordance with exemplary embodiment 5 are described in the form of additional explanation of the operations in accordance with exemplary embodiment 4.

In addition to the operations in accordance with exemplary embodiment 4, when compressor 1 completely halts at timing F, re-energization is started and capacitor 3 is discharged until its voltage decreases to a predetermined value VL as shown by section Z2 in FIG. 4A. The discharge current of this section Z2 is smaller than those of exemplary embodiments 2 and 3. This is because compressor 1 stops its rotation once and thus the capacitor is discharged at a current flowing at start-up (about 1A according to experiments) and not at a load current at that time. In this case, the time of section Z2 is 270 milliseconds, when capacitor 3 having a terminal voltage of 300 V and a capacitor of 1000 $\mu$F is discharged to 30 V at a discharge current of 1 A.

When the waiting time T3 is 1 second, a safety voltage will be reached in 1.27 seconds in total. This is much shorter than a dozen seconds, a time required for the conventional driver. Therefore, like exemplary embodiments 2 and 3, mechanics and crew hardly receive electric shocks or make the system short-circuited. These exemplary embodiments 4 and 5 have an additional advantage that the stress on switch 4 when the circuit is interrupted is smaller.

FIG. 4B is a control flow chart of driver 5 in accordance with exemplary embodiments 4 and 5.

First, whether an instruction to stop the operation has been given to driver 5 is checked (Step 301). When the instruction has been given, output of driver 5 is switched off to de-energize compressor 1 (Step 302). Next, timer 8 is made to start measuring time (Step 303), and whether time T3 to wait for re-energization has been elapsed is checked (Step 304). When time T3 has been elapsed, compressor 1 is re-energized (Stop 305). Then, whether the voltage of capacitor 3 is smaller than predetermined value VL is checked (Step 306). When the voltage of capacitor 3 is smaller than VL, output of driver 5 is switched off to de-energize compressor 1 again (Step 307). When the voltage of capacitor is not yet smaller than VL, the energization is continued (Step 306 again). By controlling in this manner, stress on switch 4 can be reduced.

Exemplary Embodiment 6

Figure 5:
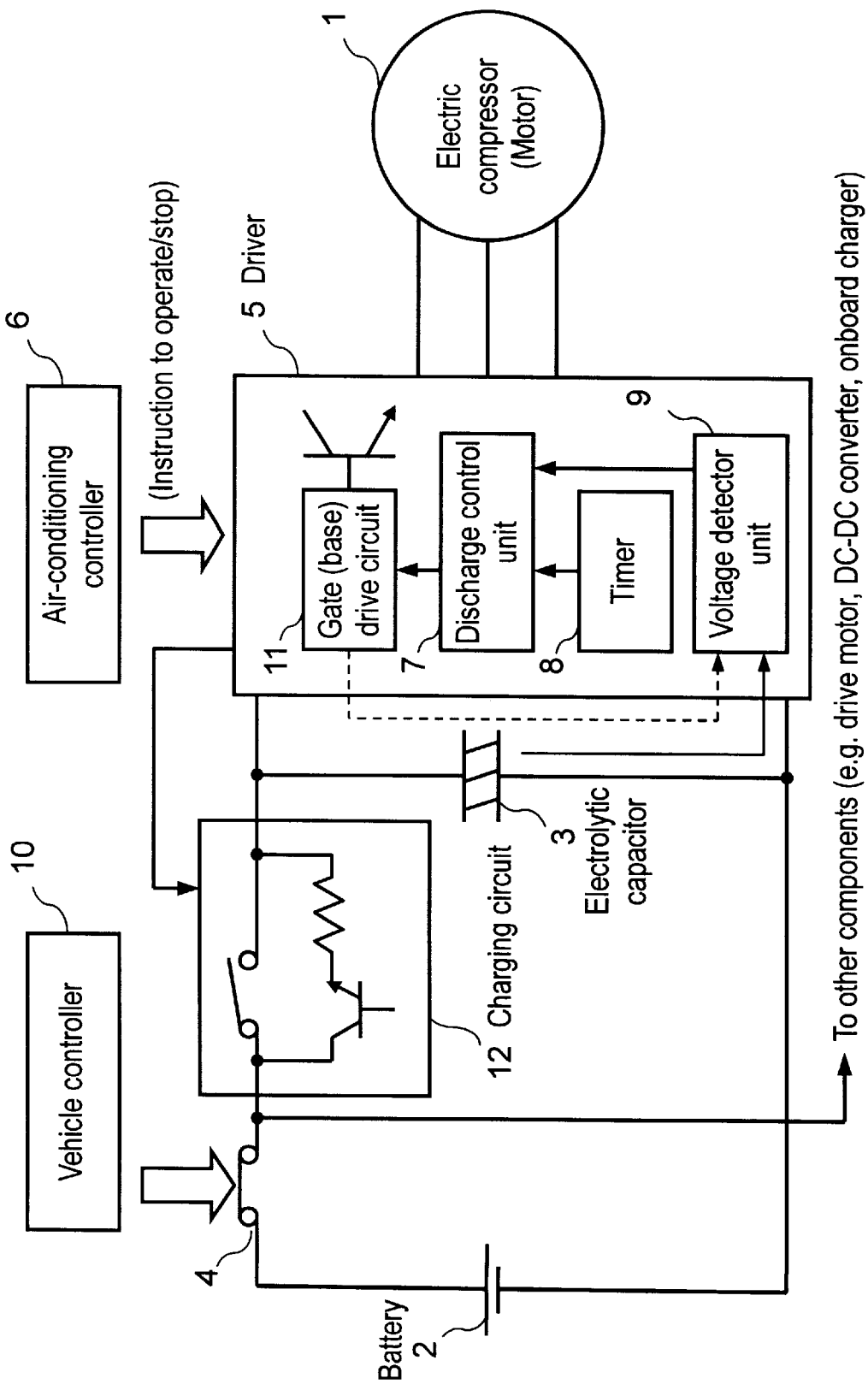
FIG. 5 is a circuit diagram showing a driving device for a motor-driven compressor in accordance with a sixth exemplary embodiment of the present invention.
Figure 6:
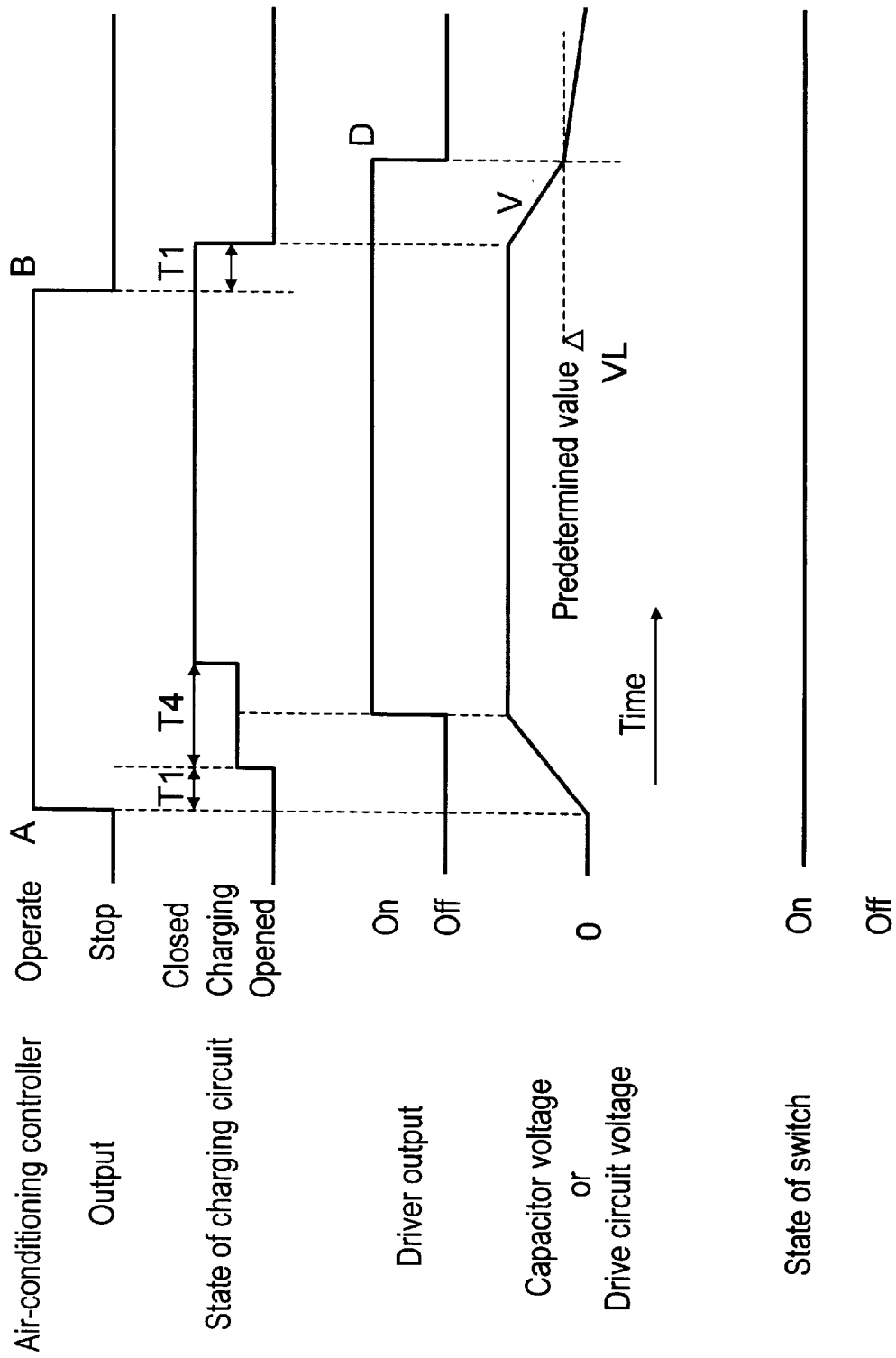
FIG. 6 is a timing chart showing the operation of the driving device in accordance with the sixth embodiment.
Figure 7:
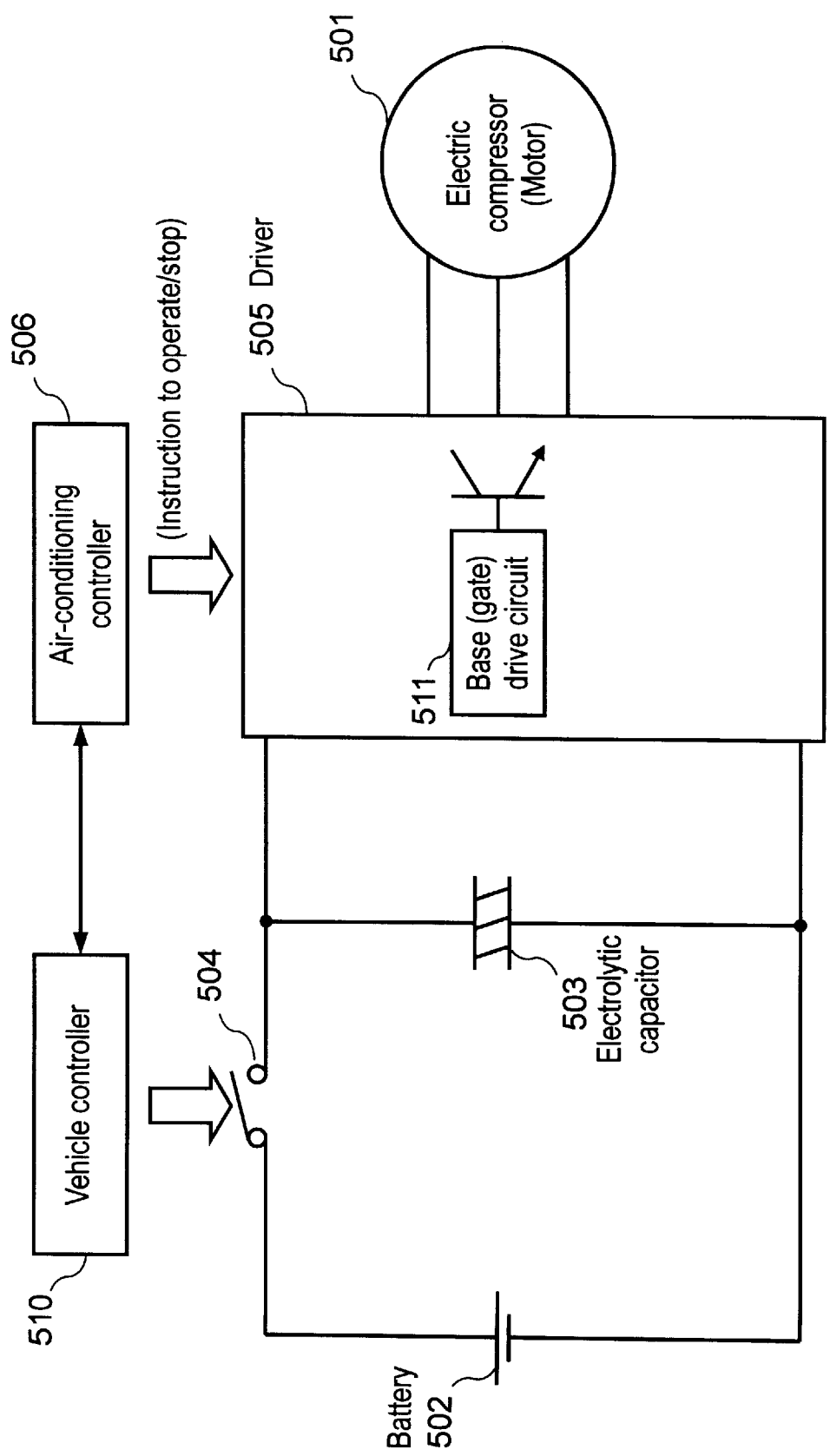
FIG. 7 is a circuit diagram showing a conventional driving device for a motor-driven compressor.
Figure 8B:
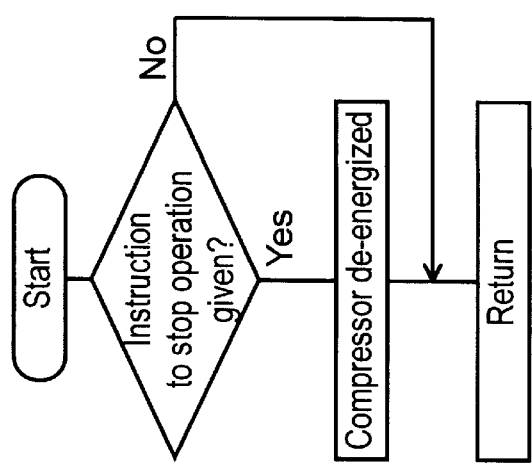
FIG. 8B is a control flow chart of the conventional driving device.
Figure 8A:
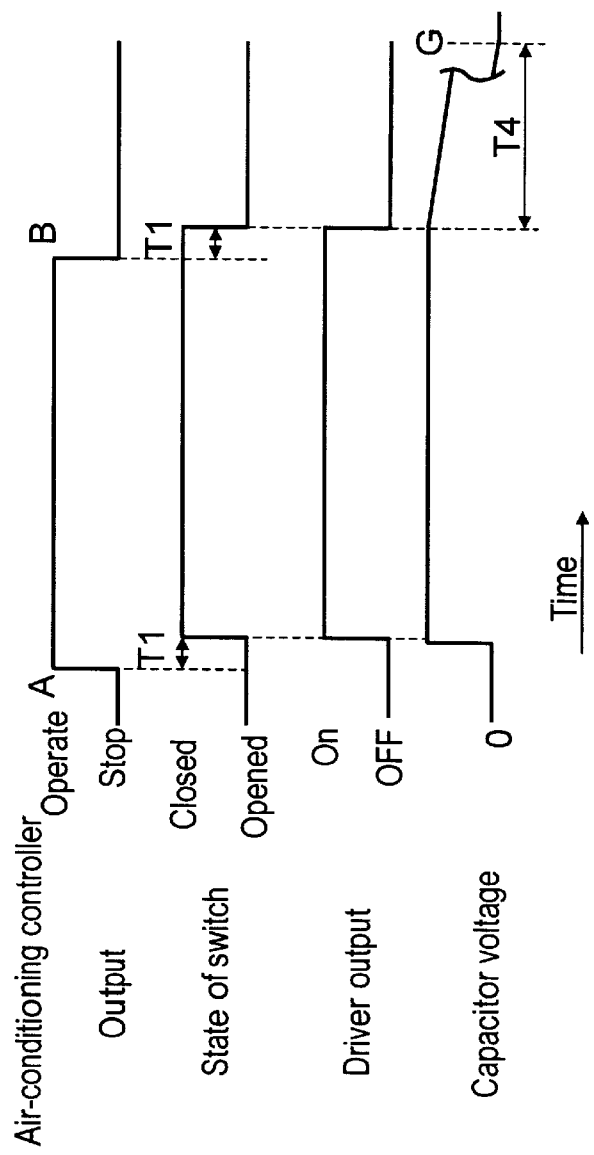
FIG. 8A is a timing chart showing the operation of the conventional driving device.

FIG. 5 is a circuit diagram showing a driving device for a motor-driven compressor in accordance with exemplary embodiment 6 of the present invention and FIG. 6 is a timing chart showing the operation of the driving device.

As described above, the switch in the circuitry of exemplary embodiments 1 through 5 is exclusive to the air-conditioning system. However, in some cases, as shown in FIG. 5, the switch is shared with other components, e.g. a vehicle drive motor, DC-DC converter, onboard charger. In such a case, the same effect can be obtained by providing charging circuit 12 incorporating a switching function as shown in FIG. 5 in the air-conditioning system and controlling the charging circuit as a switch exclusive to the air-conditioning system. While charging the capacitor has not specifically been mentioned for the above exemplary embodiments 1 through 5, providing a circuit as shown in this charging circuit 12 can offer a system with a small rush current and higher reliability.

In a timing chart shown in FIG. 6, the charging circuit is characterized by having a "charging" state other than "opened", and "closed" states. During charging, i.e. time T4 in FIG. 6, by turning on the transistor in charging circuit 12 shown in FIG. 5, capacitor 3 can slowly be charged via a resistor connected to the emitter of the transistor. As a result, the rush current to capacitor 3, or the like can be reduced.

Since other operations are similar to those for exemplary embodiment 3, the description is omitted. Needless to say, any discharging operation described in other embodiments can be combined with each other.

As hereinabove described, according to the present invention, various control operations are performed using the motor of the motor-driven compressor as discharge load of the capacitor in an air-conditioning system of an electric vehicle, hybrid car, and fuel cell powered vehicle, or the like, operating from a high-voltage power source, or in another air-conditioning system using a flammable refrigerant. These control operations provide such an air-conditioning system with improvement in safety of its crew and mechanics, and reduction in size, weight, and cost, higher efficiency, and moreover, improvement in reliability.

In each of the embodiments, the present invention is described in respect to automobile applications. However, it is not limited to automobile applications, and can also be implemented in household air-conditioning systems, or the like, especially requiring assurances of safety.

What is claimed is:

1. A driving device for a motor-driven compressor including:
   (a) a motor-driven compressor for compressing a refrigerant;
   (b) a DC power supply serving as a power source of said motor-driven compressor;
   (c) a capacitor connected in parallel with said DC power supply;
   (d) a switch provided between said DC power supply and said capacitor, and closed when said motor-driven compressor is operated and opened when said compressor is stopped;
   (e) a driver for converting electric power supplied from said DC power supply via said switch and said capacitor into driving power for said motor-driven compressor, and for outputting the driving power to said motor-driven compressor;
   (f) a controller for giving said driver one of an instruction to operate and an instruction to stop said motor-driven compressor; and
   (g) a discharge control unit provided in said driver and controlling said driver so that electric charge of said capacitor is discharged using said motor-driven compressor as a medium, after the instruction to stop said motor-driven compressor has been given.

2. The driving device for a motor-driven compressor as described in claim 1 wherein
   said discharge control unit controls said driver so that the electric charge of said capacitor is discharged while energization from said driver to said motor-driven compressor is continued for a predetermined period of time, after the instruction to stop said motor-driven compressor has been given.

3. The driving device for a motor-driven compressor as described in claim 1 further including:
   a voltage detector unit for detecting any one of a voltage of said capacitor and voltages that vary with the voltage of said capacitor; and
   said discharge control unit for controlling said driver so that the electric charge of said capacitor is discharged while energization to said motor-driven compressor is continued until the voltage detected by said voltage detector unit decreases to a value not greater than a predetermined value, after the instruction to stop said motor-driven compressor has been given.

4. The driving device for a motor-driven compressor as described in claim 1 including:

said discharge control unit for controlling the driver so that the electric charge of said capacitor is discharged while said motor-driven compressor is de-energized once and then re-energized after a predetermined period of time is elapsed, after the instruction to stop said motor-driven compressor has been given.

5. The driving device for a motor-driven compressor as described in claim 1 further including:

a voltage detector unit for detecting any one of a voltage of said capacitor and voltages that vary with the voltage of said capacitor; and said discharge control unit for controlling said driver so that the electric charge of said capacitor is discharged while energization to said motor-driven compressor is stopped once and started again after a predetermined period of time, and is further continued until the voltage detected by said voltage detector unit decreases to a value not greater than a predetermined value, after the instruction to stop said motor-driven compressor has been given.

6. The driving device for a motor-driven compressor as described in claim 1 wherein said switch is composed of a charging circuit with a switching function for slowly charging said capacitor.

* * * * *